(12) United States Patent
Cavallo (10) Patent No.: US 8,424,016 B2
(45) Date of Patent: *Apr. 16, 2013

(54) TECHNIQUES TO MANAGE CRITICAL REGION INTERRUPTS

(75) Inventor: Joseph S. Cavallo, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,382

(22) Filed: Mar. 29, 2011

(65) Prior Publication Data

US 2011/0264836 A1 Oct. 27, 2011

Related U.S. Application Data

(63) Continuation of application No. 10/809,968, filed on Mar. 26, 2004, now Pat. No. 7,917,910.

(51) Int. Cl.
*G06F 9/46* (2006.01)
*G06F 15/76* (2006.01)
*G06F 11/00* (2006.01)
*G06F 13/24* (2006.01)
*G06F 13/26* (2006.01)

(52) U.S. Cl.
USPC ............... 718/108; 718/102; 718/100; 714/2; 714/16; 714/38.13; 710/260; 710/262; 710/264; 712/228

(58) Field of Classification Search .......... 718/100–106, 718/108; 710/260–266; 712/20, 28; 714/2, 714/16, 37–38, 100
See application file for complete search history.

(56) References Cited

U.S. PATENT DOCUMENTS

| | | | |
|---|---|---|---|
| 5,542,076 A * | 7/1996 | Benson et al. | 710/260 |
| 6,697,834 B1 * | 2/2004 | Dice | 718/102 |
| 6,799,236 B1 * | 9/2004 | Dice et al. | 710/200 |
| 7,178,062 B1 * | 2/2007 | Dice | 714/38.13 |
| 7,200,846 B2 * | 4/2007 | Dice et al. | 718/102 |
| 2004/0025160 A1 * | 2/2004 | Dice et al. | 718/102 |

* cited by examiner

*Primary Examiner* — Abdullah Al Kawsar
(74) *Attorney, Agent, or Firm* — Caven & Aghevli LLC (57) ABSTRACT

Briefly, techniques to manage interrupts and swaps of threads operating in critical region. In an embodiment, a thread is to be interrupted during a first critical region with an interrupt routine. The thread may be set to restart at a beginning of the first critical region in response to an indication that the thread is working in a critical region. Other embodiments are also claimed and disclosed.

12 Claims, 5 Drawing Sheets

TECHNIQUES TO MANAGE CRITICAL REGION INTERRUPTS

FIELD

The subject matter disclosed herein generally relates to techniques for managing swaps and interrupts.

DESCRIPTION OF RELATED ART

Interrupts involve interrupting a thread, running another code called an interrupt service routine (ISR), completing the ISR, then allowing the thread to continue running from the point where it was interrupted. Swaps involve interrupting a running thread with a second thread, running the second thread, then continuing the first thread from the point where it was swapped. The thread that was interrupted or swapped makes no determination that it has been interrupted or swapped. Herein, the term "interrupt" includes swaps.

Operating system code, driver code and most low-level firmware code handle critical regions. Accesses to critical regions will cause an inconsistency if the thread running through the critical region is interrupted and another thread makes some accesses that have collided with this critical region code. Typically the solution is for any thread entering a critical region to disable all interrupts before it enters the critical region, then re-enable interrupts when it exits the region. This summary disabling can make other parts of the program that depend on interrupts become virtually non-deterministic with regard to response time because their interrupts may occur while a thread is operating in a critical region. Because of this, real time operating systems usually have to declare response times of the worst case to take into account disabled interrupts. Furthermore many or most real time operating systems can be proven to violate their declared response time during some fringe cases.

Most firmware real-time operating systems and drivers have code critical regions for which they need to disable interrupts that may collide with the critical region. Accordingly, some microprocessor response times may become non-deterministic. Some input/output hardware drivers, such as for Small Computer Systems Interface chips and possibly Serial Attached Small Computer Systems Interface, fiber channel, and/or Serial Advanced Technology Attachment chips rely on deterministic microprocessor interrupt responses to conform to their respective protocols. In other words, if the microprocessor responds to a chip late then the chip will respond on its bus late, possibly late enough to violate its respective protocol. Techniques are needed to handle interrupts while a thread is operating in a critical region without summarily disabling interrupts.

BRIEF DESCRIPTION OF THE DRAWINGS

Note that use of the same reference numbers in different figures indicates the same or like elements.

DETAILED DESCRIPTION

Figure 1:
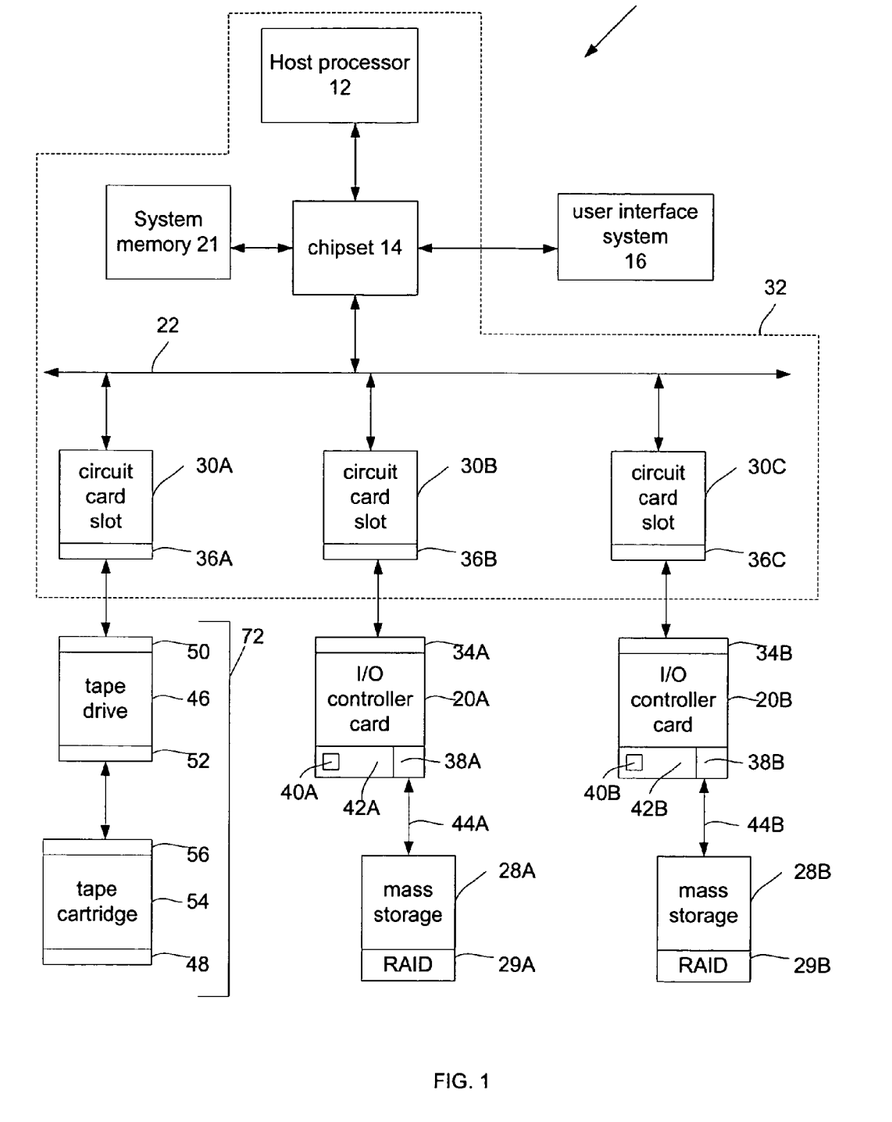
FIG. 1 illustrates a system in accordance with an embodiment of the present invention.

FIG. 1 illustrates a system embodiment 10. System 10 may include a host processor 12 coupled to a chipset 14. Host processor 12 may comprise, for example, an Intel® Pentium® III or IV microprocessor commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system (not shown) that may couple host processor 12, a system memory 21 and a user interface system 16 to each other and to a bus system 22. Chipset 14 may also include an input/output (I/O) bridge/hub system (not shown) that may couple the host bridge/bus system to bus 22. Chipset 14 may comprise integrated circuit chips, such as those selected from integrated circuit chipsets commercially available from the Assignee of the subject application (e.g., graphics memory and I/O controller hub chipsets), although other integrated circuit chips may also, or alternatively be used, without departing from this embodiment. Additionally, chipset 14 may include an interrupt controller (not shown) that may be coupled, via one or more interrupt signal lines (not shown), to other components, such as, e.g., I/O controller circuit card 20A, I/O controller card 20B, and/or one or more tape drives (collectively and/or singly referred to herein as "tape drive 46"), when card 20A, card 20B, and/or tape drive 46 are inserted into circuit card bus extension slots 30B, 30C, and 30A, respectively. This interrupt controller may process interrupts that it may receive via these interrupt signal lines from the other components in system 10. In some cases, the interrupt controller may process interrupts received from modules within the host processor 12. For example, host processor 12 may utilize a timer that can interrupt a running thread to run another interrupt service routine.

The operative circuitry 42A and 42B described herein as being comprised in cards 20A and 20B, respectively, need not be comprised in cards 20A and 20B, but instead, without departing from this embodiment, may be comprised in other structures, systems, and/or devices that may be, for example, comprised in motherboard 32, coupled to bus 22, and exchange data and/or commands with other components in system 10. User interface system 16 may comprise, e.g., a keyboard, pointing device, and display system that may permit a human user to input commands to, and monitor the operation of, system 10.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (as well as revisions thereof) (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (as well as revisions thereof) (hereinafter referred to as a "PCI-X bus"). Also alternatively, bus 22 may comprise other types and configurations of bus systems, without departing from this embodiment.

I/O controller card 20A may be coupled to and control the operation of a set of one or more magnetic disk, optical disk, solid-state, and/or semiconductor mass storage devices (hereinafter collectively or singly referred to as "mass storage 28A"). In this embodiment, mass storage 28A may comprise, e.g., a mass storage subsystem comprising one or more redundant arrays of inexpensive disk (RAID) mass storage devices 29A.

I/O controller card 20B may be coupled to and control the operation of a set of one or more magnetic disk, optical disk, solid-state, and/or semiconductor mass storage devices (hereinafter collectively or singly referred to as "mass storage 28B"). In this embodiment, mass storage 28B may comprise, e.g., a mass storage subsystem comprising one or more redundant arrays of inexpensive disk (RAID) mass storage devices 29B.

Processor 12, system memory 21, chipset 14, bus 22, and circuit card slots 30A, 30B, and 30C may be comprised in a single circuit board, such as, for example, a system motherboard 32. Mass storage 28A and/or mass storage 28B may be comprised in one or more respective enclosures that may be separate from the enclosure in which motherboard 32 and the components comprised in motherboard 32 are enclosed.

Depending upon the particular configuration and operational characteristics of mass storage 28A and mass storage 28B, I/O controller cards 20A and 20B may be coupled to mass storage 28A and mass storage 28B, respectively, via one or more respective network communication links or media 44A and 44B. Cards 20A and 20B may exchange data and/or commands with mass storage 28A and mass storage 28B, respectively, via links 44A and 44B, respectively, using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller cards 20A and 20B may exchange data and/or commands with mass storage 28A and mass storage 28B, respectively, using other communication protocols, without departing from this embodiment.

In accordance with this embodiment, a SCSI protocol that may be used by controller cards 20A and 20B to exchange data and/or commands with mass storage 28A and 28B, respectively, may comply or be compatible with the interface/protocol described in American National Standards Institute (ANSI) Small Computer Systems Interface-2 (SCSI-2) ANSI X3.131-1994 Specification. If a FC protocol is used by controller cards 20A and 20B to exchange data and/or commands with mass storage 28A and 28B, respectively, it may comply or be compatible with the interface/protocol described in ANSI Standard Fibre Channel (FC) Physical and Signaling Interface-3 X3.303:1998 Specification. Alternatively, if an Ethernet protocol is used by controller cards 20A and 20B to exchange data and/or commands with mass storage 28A and 28B, respectively, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller cards 20A and 20B to exchange data and/or commands with mass storage 28A and 28B, respectively, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller cards 20A and 20B to exchange data and/or commands with mass storage 28A and 28B, respectively, it may comply or be compatible with the protocols described in Internet Engineering Task Force (IETF) Request For Comments (RFC) 791 and 793, published September 1981.

Circuit card slots 30A, 30B, and 30C may comprise respective PCI expansion slots that may comprise respective PCI bus connectors 36A, 36B, and 36C. Connectors 36A, 36B, and 36C may be electrically and mechanically mated with PCI bus connectors 50, 34A, and 34B that may be comprised in tape drive 46, card 20A, and card 20B, respectively. Circuit cards 20A and 20B also may include respective operative circuitry 42A and 42B. Circuitry 42A may comprise a respective processor (e.g., an Intel® Pentium® III or IV microprocessor) and respective associated computer-readable memory (collectively and/or singly referred to hereinafter as "processor 40A"). Circuitry 42B may comprise a respective processor (e.g., an Intel® Pentium® III or IV microprocessor) and respective associated computer-readable memory (collectively and/or singly referred to hereinafter as "processor 40B"). The respective associated computer-readable memory that may be comprised in processors 40A and 40B may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, such computer-readable memory may comprise other and/or later-developed types of computer-readable memory. Also either additionally or alternatively, processors 40A and 40B each may comprise another type of microprocessor, such as, for example, a microprocessor that is manufactured and/or commercially available from a source other than the Assignee of the subject application, without departing from this embodiment.

Respective sets of machine-readable firmware program instructions may be stored in the respective computer-readable memories associated with processors 40A and 40B. These respective sets of instructions may be accessed and executed by processors 40A and 40B, respectively. When executed by processors 40A and 40B, these respective sets of instructions may result in processors 40A and 40B performing the operations described herein as being performed by processors 40A and 40B.

Circuitry 42A and 42B may also comprise cache memory 38A and cache memory 38B, respectively. In this embodiment, cache memories 38A and 38B each may comprise one or more respective semiconductor memory devices. Alternatively or additionally, cache memories 38A and 38B each may comprise respective magnetic disk and/or optical disk memory. Processors 40A and 40B may be capable of exchanging data and/or commands with cache memories 38A and 38B, respectively, that may result in cache memories 38A and 38B, respectively, storing in and/or retrieving data from cache memories 38A and 38B, respectively, to facilitate, among other things, processors 40A and 40B carrying out their respective operations.

Tape drive 46 may include cabling (not shown) that couples the operative circuitry (not shown) of tape drive 46 to connector 50. Connector 50 may be electrically and mechanically coupled to connector 36A. When connectors 50 and 36A are so coupled to each other, the operative circuitry of tape drive 46 may become electrically coupled to bus 22. Alternatively, instead of comprising such cabling, tape drive 46 may comprise a circuit card that may include connector 50.

Tape drive 46 also may include a tape read/write mechanism 52 that may be constructed such that a mating portion 56 of a tape cartridge 54 may be inserted into mechanism 52.

When mating portion 56 of cartridge 54 is properly inserted into mechanism 52, tape drive 46 may use mechanism 52 to read data from and/or write data to one or more tape data storage media 48 (also referenced herein in the singular as, for example, "tape medium 48") comprised in cartridge 54, in the manner described hereinafter. Tape medium 48 may comprise, e.g., an optical and/or magnetic mass storage tape medium. When tape cartridge 54 is inserted into mechanism 52, cartridge 54 and tape drive 46 may comprise a backup mass storage subsystem 72.

Slots 30B and 30C are constructed to permit cards 20A and 20B to be inserted into slots 30B and 30C, respectively. When card 20A is properly inserted into slot 30B, connectors 34A and 36B become electrically and mechanically coupled to each other. When connectors 34A and 36B are so coupled to each other, circuitry 42A in card 20A may become electrically coupled to bus 22. When card 20B is properly inserted into slot 30C, connectors 34B and 36C become electrically and mechanically coupled to each other. When connectors 34B and 36C are so coupled to each other, circuitry 42B in card 20B may become electrically coupled to bus 22. When tape drive 46, circuitry 42A in card 20A, and circuitry 42B in card 20B are electrically coupled to bus 22, host processor 12 may exchange data and/or commands with tape drive 46, circuitry 42A in card 20A, and circuitry 42B in card 20B, via chipset 14 and bus 22, that may permit host processor 12 to monitor and control operation of tape drive 46, circuitry 42A in card 20A, and circuitry 42B in card 20B. For example, host processor 12 may generate and transmit to circuitry 42A and 42B in cards 20A and 20B, respectively, via chipset 14 and bus 22, I/O requests for execution by mass storage 28A and 28B, respectively. Circuitry 42A and 42B in cards 20A and 20B, respectively, may be capable of generating and providing to mass storage 28A and 28B, via links 44A and 44B, respectively, commands that, when received by mass storage 28A and 28B may result in execution of these I/O requests by mass storage 28A and 28B, respectively. These I/O requests, when executed by mass storage 28A and 28B, may result in, for example, reading of data from and/or writing of data to mass storage 28A and/or mass storage 28B.

Figure 2:
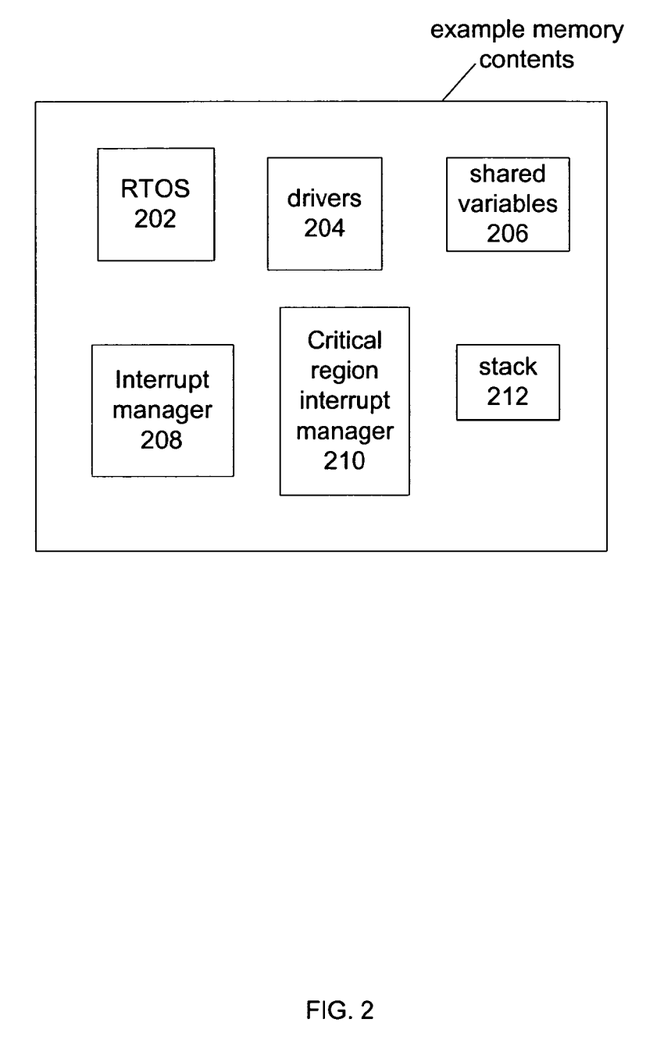
FIG. 2 depicts an example of contents of a computer-readable memory in accordance with an embodiment of the present invention.

I/O controller circuit card 20A and/or 20B may utilize some embodiments of the present invention to manage interrupts of threads operating in critical regions. For example, FIG. 2 depicts an example of contents of a computer-readable memory of circuitry 42A and 42B. For example, each memory may store a real time operating system (RTOS) 202, drivers 204, shared variables 206, interrupt manager 208, critical region task manager 210, and program stack 212. For example, shared variables 206 may store an Interrupt Return Descriptor Block as well as the in_CR and IDCR flags (each described in more detail with respect to FIGS. 3 and 4).

Interrupt manager 208 may be utilized in connection with an interrupt of a thread. Example threads include, but are not limited to, portions of an operating system, drivers, or firmware code. In one embodiment, if the thread was interrupted in a critical region, after an interrupt is completed, interrupt manager 208 may re-start the interrupted thread at the beginning of the critical region and indicate that such critical region had been interrupted.

Critical region task manager 210 may control whether a thread is allowed to be interrupted during a critical region. If the thread is allowed to be interrupted during the critical region, critical region task manager 210 may make a determination whether the thread was previously interrupted during the same critical region, check for inconsistencies and errors that may have been introduced by an interrupting task, repair the inconsistencies and errors, and then complete the work of the same critical region.

Figure 3:
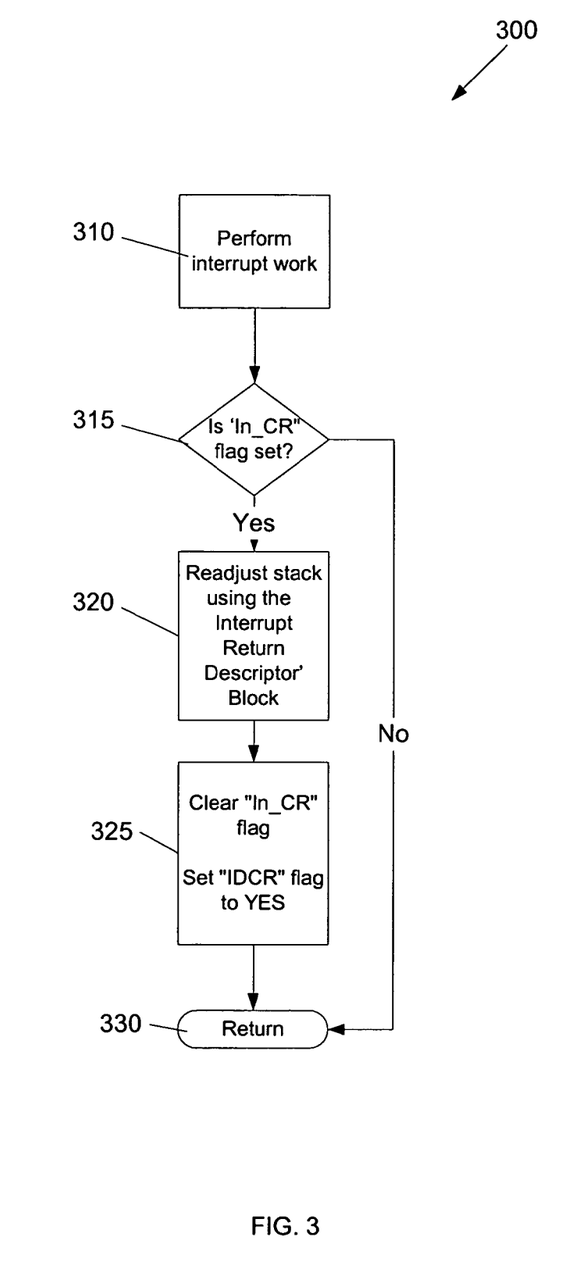
FIG. 3 depicts an example process that can be used by interrupt manager, in accordance with an embodiment of the present invention.

FIG. 3 depicts an example process 300 that can be used by interrupt manager 208, in accordance with an embodiment of the present invention. Interrupt manager 208 may be called by a routine (such as an operating system, driver, or firmware code) prior to an interrupt service routine being performed.

Action 310 may include performing the interrupt task.

Action 315 may include determining whether the thread that was interrupted was operating in a critical region when interrupted. For example, a variable "in_CR" may be used to indicate whether the interrupted thread was operating in a critical region when interrupted. For example, action 435 of process 400 may be used to set the variable "in_CR" to indicate a thread is operating in a critical region (described with respect to FIG. 4). If the interrupted thread was operating in a critical region when interrupted, then action 320 may follow action 315. If the interrupted thread was not operating in a critical region when interrupted, then action 330 may follow action 315.

Action 320 may include readjusting the stack of the thread that got interrupted to its state prior to entering the critical region. For example, action 320 may use the stack pointer and program counter (PC) from the Interrupt Return Descriptor Block to readjust the stack.

Action 325 may include setting a flag to indicate that the thread identified in action 315 as being interrupted was not interrupted during a critical region by clearing flag "in_CR". Furthermore, action 325 may also include setting another flag to indicate that a thread operating in the critical region and identified in action 315 has been interrupted (flag "IDCR").

Action 330 may include returning to the task or routine that called upon interrupt manager 208.

Figure 4:
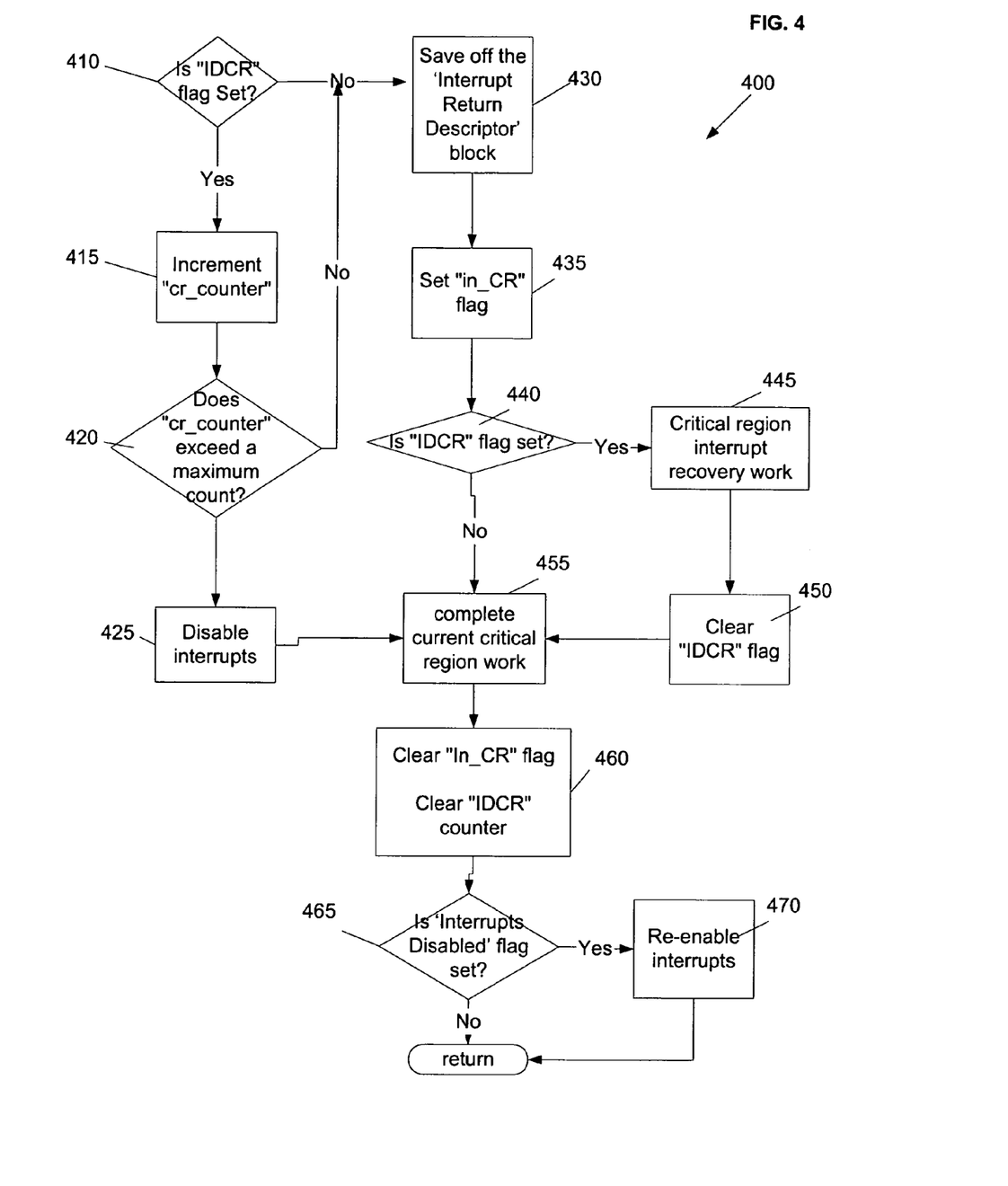
FIG. 4 depicts an example process that can be used by critical region task manager, in accordance with an embodiment of the present invention.

Critical region task manager 210 may be called by a thread of a routine (such as an operating system, driver, or firmware code) prior to entering into a critical region. FIG. 4 depicts an example process 400 that can be used by critical region task manager 210, in accordance with an embodiment of the present invention. Process 400 may be interrupted during operation if permitted according to flag "Interrupt Disabled". If process 400 is interrupted then it will return from completion of the interrupt routine to action 410 instead of to the point where process 400 was interrupted.

Action 410 may include determining whether the current critical region thread was previously interrupted during the same critical region. For example, action 325 of process 300 (described with respect to FIG. 3) may set the flag IDCR to indicate that the current critical region thread was previously interrupted. For example, action 410 includes determining whether variable "IDCR" is set to indicate that the current critical region thread was previously interrupted. Action 415 follows action 410 if the current critical region thread was previously interrupted during the same critical region. Action 430 follows action 410 if the current critical region thread was not previously interrupted during the same critical region.

Action 415 may include incrementing a counter that counts the number of times the current critical region thread was previously interrupted (variable "cr_count") during that critical region.

Action 420 may include determining whether the number of times the current critical region thread has been interrupted is within a permitted range. Action 420 may limit a maximum permitted number of times a critical region can be interrupted. For example, action 420 may include determining whether variable "cr_count" exceeds a maximum permitted count. If the number of times the current critical region thread has been interrupted is impermissible, then action 425 follows action 420. If the number of times the current critical region thread has been interrupted is permissible, then action 430 follows action 420.

Action 425 may include not allowing any interrupt of the current critical region of the current thread. For example, action 425 may include setting flag "Interrupt Disabled" to YES.

Action 430 may include saving an "Interrupt Return Descriptor Block" that describes the state of the stack before the current critical region was entered (e.g., stack pointer at the point just prior to the current critical region being entered, contents of all registers used by the current critical region thread, the program counter at the point just prior to the current critical region being entered, and current state of flag "in_CR".

Action 435 may include setting the "in_CR" flag to indicate that a thread currently operates in a critical region.

Action 440 may include determining whether the current critical region thread was previously interrupted during the same critical region. For example, action 440 may include determining whether variable "IDCR" is set to indicate that the current thread was previously interrupted during the same critical region. Although the current critical region may have restarted, there may have been some activity performed during the current critical region before being interrupted. In such case, variables incompletely manipulated may have to be repaired so that the current critical region can process them and produce correct results. Action 445 follows action 440 if the current thread was previously interrupted during the same critical region. Action 455 follows action 440 if the current thread was not previously interrupted during the same critical region.

Action 445 may include performing recovery work of the current critical region. For example, if the current critical region was interrupted for a second task, after the second task completes, action 445 may provide that the current critical region enter a subroutine specifically designed to fix any incomplete processes or errors. Many different types of repair may be performed. One example is in the context of double linked lists. For example if the current critical region modified a double linked list but was interrupted for a second task, then the double linked list may be incompletely modified and therefore unusable. After the second task completes the current critical region may enter a subroutine specifically designed to fix any incomplete processes or errors. For example to fix modified double linked lists, the subroutine may check for and correct forward and backwards pointers that are inconsistent.

Action 450 may include clearing the "IDCR" flag to indicate that the current critical region was not previously interrupted.

Action 455 may include completing the current critical region thread.

Action 460 may include setting the "in_CR" flag to indicate that a thread is not operating in a critical region and setting the "IDCR counter" to zero. Action 460 may indicate that the current critical region thread was successfully completed and so if an interrupt is to subsequently take place, the current critical region thread will not be disturbed.

Action 465 and 470 may provide for re-enabling interrupts of the current thread if interrupts were set to not be permitted. For example variable "Interrupts Disabled" is changed to indicate that interrupts are to be permitted.

Action 475 may include returning to the routine that called process 400.

Figure 5:
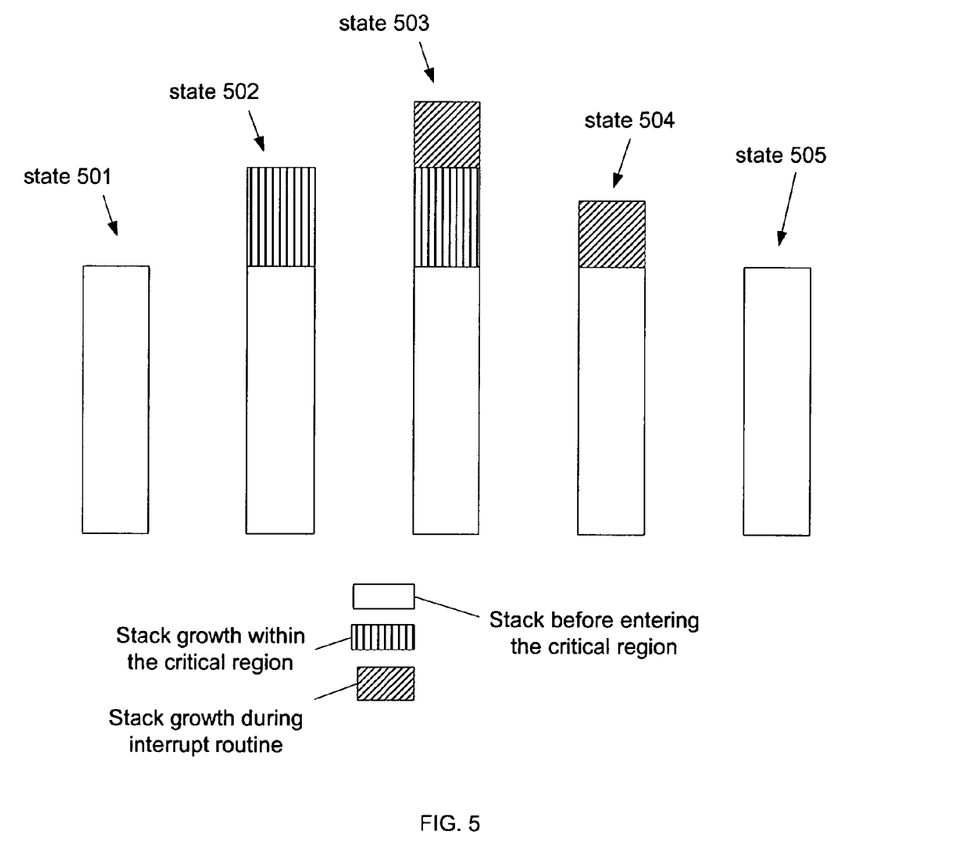
FIG. 5 depicts an example of stack growth and modification as provided by interrupt manager and critical region task manager, in accordance with an embodiment of the present invention.

For example, FIG. 5 depicts one possible example of stack growth and modification as provided by an example operation of interrupt manager 208 and critical region task manager 210, in accordance with an embodiment of the present invention. State 501 may correspond to a program stack prior to entering a critical region. Action 430 of process 400 may store in the Interrupt Return Descriptor Block the state of the program stack and related registers for state 501.

State 502 may correspond to a program stack while critical region work is performed. For example, the program stack may grow while critical region work is performed.

State 503 may correspond to a program stack after the critical region was interrupted and the interrupt task being performed. State 503 may include stack growth during the interrupt task being performed. For example, state 503 may correspond to execution of action 310 of process 300.

For example, state 504 may correspond to execution of action 320 whereby interrupt manager 208 removes the "critical region" part of the stack (i.e., any stack growth that occurred after action 410 but before action 460 of the process 400 described with respect to FIG. 4) by setting the stack pointer and program counter so that the interrupted critical region will start at a place that corresponds to action 410 of FIG. 4.

State 505 may correspond to a program stack just prior to the critical region being re-started. For example, state 505 may occur after the interrupt routine completes and the thread restarts at a place that corresponds to action 410 of FIG. 4.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. For example, components of motherboard 32 may utilize embodiments of the present invention described herein. The scope of the invention is at least as broad as given by the following claims.

What is claimed is:
1. A method comprising:
  interrupting a thread with an interrupt routine during a first critical region; and
  setting a first flag to mark the thread as having been interrupted during the first critical region;
  setting the thread to restart at a beginning of the first critical region in response to an indication that the thread is working in a critical region, wherein the thread is to avoid disabling all interrupts before it enters the first critical region and avoid re-enabling the interrupts after exiting the first critical region,
  wherein setting the thread to start at the beginning of the first critical region comprises: determining if the thread has been previously interrupted during the first critical region based on the first flag and incrementing a count of a number of times the thread in the first critical region has been interrupted in response to the thread in the first critical region having been previously interrupted, saving program stack conditions of the interrupted thread in response to the thread not having been interrupted during the first critical region more than a permitted number of times, performing critical region interrupt recovery work in response to an indication that the first critical region was previously interrupted, and attempting to complete first critical region work.

2. The method of claim 1, wherein the critical region interrupt recovery work corrects errors that arise from previously interrupting the thread in the first critical region prior to its completion.

3. The method of claim 1, wherein the first critical region further includes the acts of:
   setting a second flag to indicate that critical region work is not being performed in response to the critical region work completing; and
   setting to zero the count of the number of times the thread in the first critical region was interrupted.

4. The method of claim 1, further comprising indicating that the thread is not operating in a critical region.

5. An article comprising a non-transitory storage medium, the storage medium comprising machine readable instructions stored thereon when executed by a processor to:
   interrupt a thread With an interrupt routine during a first critical region; and
   set a first flag to mark the thread as having been interrupted during the first critical region;
   set the thread to restart at a beginning of the first critical region in response to an indication that the thread is working in a critical region, wherein the thread is to avoid disabling all interrupts before it enters the first critical region and avoid re-enabling the interrupts after exiting the first critical region,
   wherein setting the thread to start at the beginning of the first critical region comprises: determining if the thread has been previously interrupted during the first critical region based on the first flag and incrementing a count of a number of times the thread in the first critical region has been interrupted in response to the thread in the first critical region having been previously interrupted, saving program stack conditions of the interrupted thread in response to the thread not having been interrupted during the first critical region more than a permitted number of times, performing critical region interrupt recovery work in response to an indication that the first critical region was previously interrupted, and attempting to complete first critical region work.

6. The article of claim 5, wherein the critical region interrupt recovery work corrects errors that arise from previously interrupting the thread in the first critical region prior to its completion.

7. The article of claim 5, wherein the first critical region further includes the acts of:
   setting a second flag to indicate that critical region work is not being performed in response to the critical region work completing; and
   setting to zero the count of the number of times the thread in the first critical region was interrupted.

8. The article of claim 5, wherein the processor is to indicate that the thread is not operating in a critical region.

9. An apparatus comprising:
   an I/O controller device comprising a processor and a memory device, the I/O controller device comprising logic to:
   interrupt a thread with an interrupt routine during a first critical region; and
   set a first flag to mark the thread as having been interrupted during the first critical region;
   set the thread to restart at a beginning of the first critical region in response to an indication that the thread is working in a critical region, wherein the thread is to avoid disabling all interrupts before it enters the first critical region and avoid re-enabling the interrupts after exiting the first critical region,
   wherein setting the thread to start at the beginning of the first critical region comprises: determining if the thread has been previously interrupted during the first critical region based on the first flag and incrementing a count of a number of times the thread in the first critical region has been interrupted in response to the thread in the first critical region having been previously interrupted, saving program stack conditions of the interrupted thread in response to the thread not having been interrupted during the first critical region more than a permitted number of times, performing critical region interrupt recovery work in response to an indication that the first critical region was previously interrupted, and attempting to complete first critical region work.

10. The apparatus of claim 9, wherein the critical region interrupt recovery work corrects errors that arise from previously interrupting the thread in the first critical region prior to its completion.

11. The apparatus of claim 9, wherein the first critical region further includes the acts of:
    setting a second flag to indicate that critical region work is not being performed in response to the critical region work completing; and
    setting to zero the count of the number of times the thread in the first critical region was interrupted.

12. The apparatus of claim 9, further comprising logic to indicate that the thread is not operating in a critical region.

* * * * *